United States Patent
Tejada

(10) Patent No.: US 7,369,303 B2
(45) Date of Patent: May 6, 2008

(54) DUAL BAND LENS SYSTEM INCORPORATING MOLDED CHALCOGENIDE

(75) Inventor: John Tejada, Londonderry, NH (US)

(73) Assignee: Janos Technology Inc., Keene, NH (US)

( * ) Notice: Subject to any disclaimer, the term of this patent is extended or adjusted under 35 U.S.C. 154(b) by 0 days.

(21) Appl. No.: 11/346,707

(22) Filed: Feb. 3, 2006

(65) Prior Publication Data

US 2007/0183024 A1 Aug. 9, 2007

(51) Int. Cl.
*G02B 13/14* (2006.01)
(52) U.S. Cl. .................. 359/356; 359/355; 359/434
(58) Field of Classification Search ........ 359/350–361, 359/676–795
See application file for complete search history.

(56) References Cited

U.S. PATENT DOCUMENTS

| | | | | |
|---|---|---|---|---|
| 4,397,520 A | * | 8/1983 | Neil | 359/354 |
| 4,679,891 A | * | 7/1987 | Roberts | 359/357 |
| 4,989,962 A | * | 2/1991 | Kebo | 359/354 |
| 4,999,005 A | | 3/1991 | Cooper | 359/356 |
| 5,021,657 A | * | 6/1991 | Kettlewell et al. | 250/330 |
| 5,909,308 A | * | 6/1999 | Ulrich | 359/357 |
| 6,292,293 B1 | * | 9/2001 | Chipper | 359/356 |
| 6,423,969 B1 | | 7/2002 | Amon | 250/339.01 |
| 7,136,235 B2 | * | 11/2006 | Kirkham | 359/738 |
| 2004/0196372 A1 | | 10/2004 | Lannestedt | 348/164 |

OTHER PUBLICATIONS

Umicore Datasheet "GASIR® 1-Infrared transmitting Glass GASIR® 1/0601" Umicore Electro-Optic Materials, Belgium (2 pgs).
Umicore Datasheet "GASIR® 2-Infrared transmitting Glass GASIR® 2/0511" Umicore Electro-Optic Materials, Belgium (2 pgs).
Kornik, Janos Technology, Inc. "Selecting Lenses to Maximize IR Camera Performance" Photonics Spectra, Sep. 2003 (4 pgs).

* cited by examiner

*Primary Examiner*—Thong Q Nguyen
(74) *Attorney, Agent, or Firm*—Grossman, Tucker, Perreault & Pfleger, PLLC

(57) ABSTRACT

An image forming system and lens system including at least one molded chalcogenide lens element and configured to simultaneously image light at the medium wave infrared region (MWIR) and the long wave infrared region (LWIR) at a common focal plane.

14 Claims, 2 Drawing Sheets

DUAL BAND LENS SYSTEM INCORPORATING MOLDED CHALCOGENIDE

TECHNICAL FIELD

The present application generally relates to imaging devices and, more specifically, a dual band lens system incorporating molded chalcogenide.

BACKGROUND

Many imaging applications, such as military, biomedical, telescopes, reconnaissance planes, satellites, forward-looking infrared, staring sensor systems, night-vision goggles, and other optic and/or electro-optic detection systems demand simultaneous detection in separate wavelength bands, e.g. in the mid-wave infrared and the long-wave infrared spectral ranges. Traditionally, such dual band imaging has required separate refractive lens systems with separate associated detectors, or reflective systems including multiple mirror reflectors. Reflective systems have suffered from a narrow field of view, thus leading to a preference for refractive systems.

More recently, dual band refractive lens systems configured to simultaneously image light from first and second wavelength bands onto a common focal plane, e.g. at a multi-band detector, have emerged. Such systems, however, tend to include lenses with aspheric surfaces. Manufacturing of aspheric surfaces may require expensive and time consuming diamond point turning (DPT) manufacturing processes and/or additional post polishing.

Therefore, there is a need for a dual band lens system incorporating components that may be efficiently manufactured.

BRIEF DESCRIPTION OF THE DRAWINGS

So the manner in which the above recited features of the present invention can be understood in detail, a more particular description of the invention may be had by reference to the embodiments, some of which are illustrated in the appended drawings. It is to be noted; however, that the appended drawings illustrate only typical embodiments of this invention and are therefore not to be considered limiting of its scope, for the invention may admit to other equally effective embodiments. Moreover, it should be appreciated that the specific materials, lens formulations and systems applications disclosed herein are merely illustrative and do not delimit the scope of the invention.

DETAILED DESCRIPTION

Figure 1:
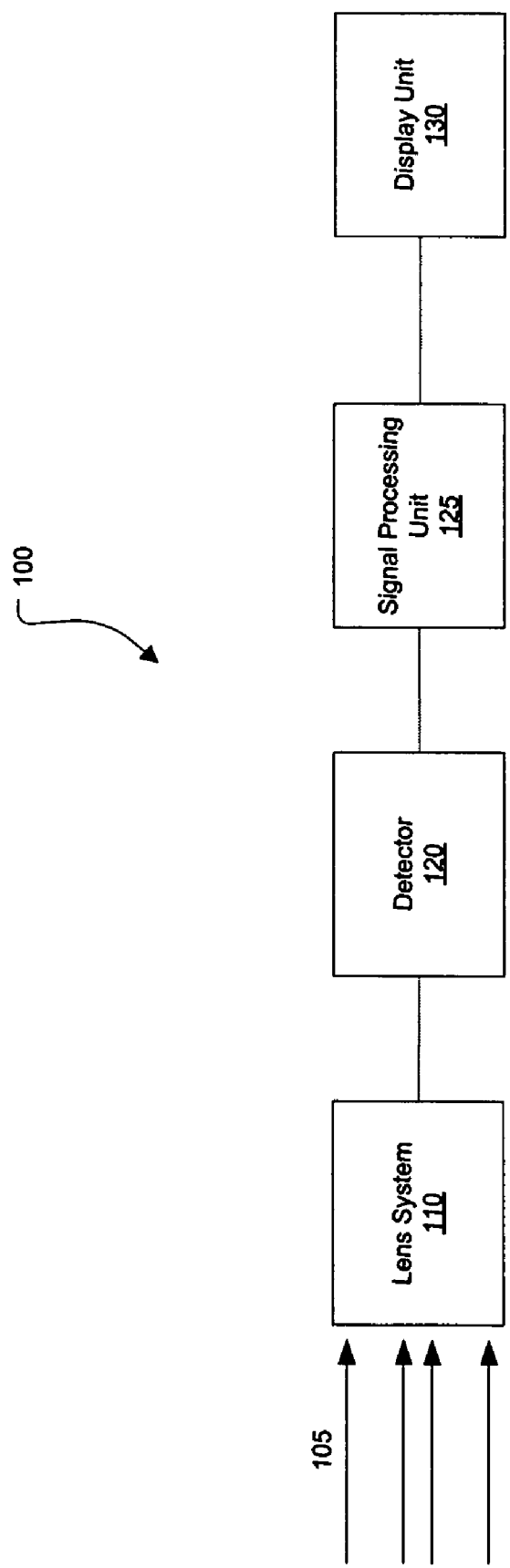
FIG. 1 is a schematic diagram of an exemplary embodiment of an image forming system consistent with the present invention.

FIG. 1 is a simplified block diagram of one exemplary embodiment of an image forming system 100 consistent with the present invention. The illustrated exemplary system 100 includes a lens system 110, a detector 120, a signal processing unit 125, and a display unit 130. Collimated light 105 imparted on the lens system 110 may be detected by detector 120. In general the detector 120 converts the light imparted thereon to electrical impulses. A variety of detector configurations are well-known to those of ordinary skill in the art. In one embodiment, for example, the detector 210 may be configured as a microbolometer.

The electric impulses provided by the detector 120 may be coupled to the signal processing unit 125. In a known manner, the signal processing unit 125 may translate the electrical impulses into data representative of an image(s) of objects that generated or reflected the light received at the lens 110. The data may be coupled to the display unit, which displays the image(s).

In one embodiment, the system 100 may be configured for simultaneously imaging light from the MWIR and LWIR bands onto a common focal plane. As used herein the "MWIR" band or spectrum shall refer to wavelengths from about 3 to about 5 micrometers, and the "LWIR" spectrum or band shall refer to wavelengths from about 8 to about 12 micrometers. Imaging multiple wavelength bands onto a common focal plane allows use of a single detector and avoids the need to refocus when imaging light from one band to the other. Such a system may be useful, for example, in providing combined thermal and night vision imaging.

Consistent with the present invention, dual band achromatic imaging may be achieved in a system incorporating one or more molded chalcogenide lens elements. The molded chalcogenide lens elements may be molded with one or more aspheric surfaces, thus avoiding expensive DPT and/or post polishing processes. Moreover, the characteristics of molded chalcogenide lens elements in the MWIR and LWIR bands allow an achromatic condition that is believed to be superior to other lens materials.

Molded chalcogenide lens elements are commercially available from Umicore Optics of Quapaw, Okla. (herein referred to as "Umicore"), e.g. under the tradename GASIR1. GASIR1 is a composition according to the formula $Ge_{22}As_{20}Se_{58}$. Molded GASR1 lens elements are characterized as exhibiting a refractive index at 8 micrometers $N_8=2.5015$, and an Abbe number $V_{3-13}=(N_8-1)/(N_3-N_{13})\approx47.8$, where $N_3$ is the refractive index at 3 micrometers and $N_{13}$ is the refractive index at 13 micrometers. According to the Umicore data sheet, the indices of refraction for GASIR1 vary between lots by less than 0.0006. Thus, GASIR1 lens elements may exhibit an index of refraction $N_8$ of about 2.5009 to 2.5021, and Abbe number $V_{3-13}$ about 47.799 to 47.837. Although the invention may be described herein with respect to Umicore GASIR1 elements, it is to be understood that molded elements having comparable characteristics but produced by other manufacturers may be used.

Figure 2:
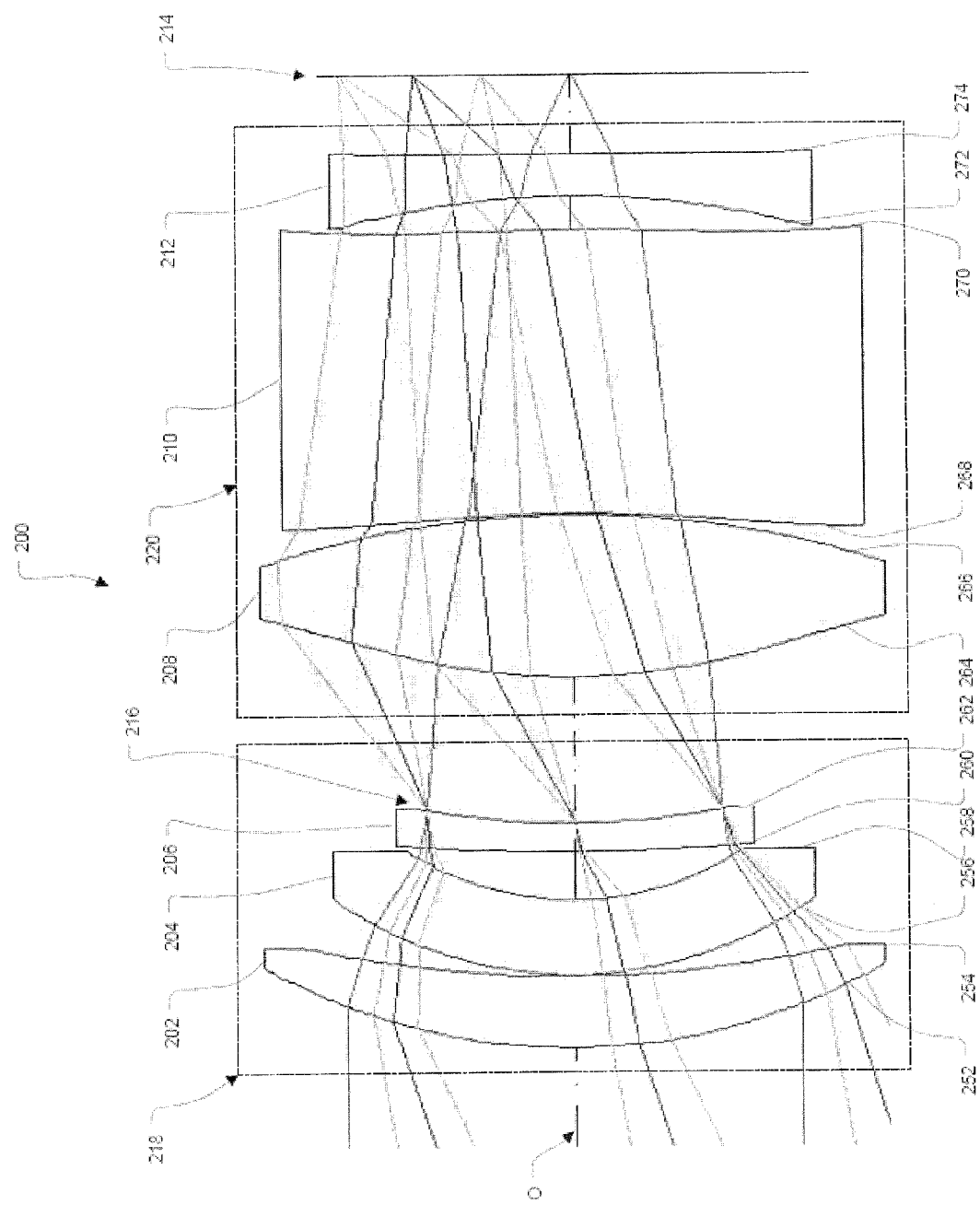
FIG. 2 is a schematic diagram of one exemplary embodiment of a lens system consistent with the present invention.

FIG. 2 illustrates one exemplary embodiment 200 of at least a portion of a lens system 110 consistent with the present invention. The illustrated exemplary embodiment 200 includes first through sixth lens elements 202, 204, 206, 208, 210 and 212 disposed along a common optical axis O, and may be used to simultaneously image light in the MWIR and LWIR bands onto a common focal or imaging plane 214, as shown.

The first 202, second 204 and third 206 lens element may form an objective lens 218 of the system. The first lens element 202 may be a positive aspheric molded GASIR1 chalcogenide element, and the second lens element 204 may be a negative element made of germanium. The third lens element 206 may be negative element made of zinc sulfide, and may be positioned adjacent an aperture stop 216 established by the objective lens 218.

A positive triplet 220 including the fourth 208, fifth 210, and sixth 212 lens elements may follow the aperture stop 216 and may focus light from the apertures stop onto the common focal plane 214. The fourth lens element 208 may be a positive aspheric molded GASIR1 chalcogenide element. The fifth lens element 210 may be an element made of germanium, and the sixth lens element 212 may be an element made of zinc sulfide.

The lens system 200 provides a super-achromatic condition in the MWTR and LWIR bands using aspheric molded chalcogenide lens elements, which may be produced without use of expensive DPT and/or post polishing processes. The prescription for the exemplary embodiment 200 is complied in Table 1 below, with reference to the surface numbers shown in FIG. 2. All of the surfaces are spherical except as otherwise indicated. Aspheric surfaces are defined herein by the sag, Z, given by $$Z = \frac{cr^2}{1+\sqrt{1-(1+k)c^2 r^2}} + Ar^4 + Br^6 + Cr^8 + Dr^{10} \quad \text{(Equation 1)}$$

wherein c is the base curvature of at the vertex, k is a conic constant, r is the radial coordinate measured perpendicularly from the optical axis, and A, B, C and D are higher order aspheric constants.

Also, in the example of Table 1, the effective focal length is 1.72 inches, the f-number (F/#) is 1.25, and the field of view half angle is 22.5 degrees. The index of refraction for molded chalcogenide lens elements ranges from about 2.489000 to 2.516400 for wavelengths from 12 to 3 micrometers. The refractive index of the germanium lens elements ranges from about 4.003900 to 4.044600 and the refractive index of the zinc sulfide lens element ranges from about 2.170071 to 2.257187 for wavelengths from 12 to 3 micrometers. Germanium and zinc sulfide lens elements exhibiting such characteristics are commercially available from Janos Technology Inc. of Keene, N.H.

elements being configured to simultaneously image light in a wavelength range from about 3 to about 5 micrometers and light in a wavelength range from about 8 to about 12 micrometers at a common focal plane; a detector positioned at the common focal plane and configured to create electrical impulses in response to the light in the wavelength range from about 3 to about 5 micrometers and the light in the wavelength range from about 8 to about 12 micrometers; and a signal processing unit configured to process the electrical impulses for displaying an image.

According to another aspect of the invention, there is provided a method including: imaging light in a wavelength range from about 3 to about 5 micrometers and light in a wavelength range from about 8 to about 12 micrometers at a common focal plane using a plurality of lenses including at least one molded aspheric chalcogenide lens element having an associated Abbe number $V_{3-13}$ in the range from about 47.799 to 47.837; and displaying an image in response to the light at the common focal plane.

While the foregoing is directed to embodiments of the present invention, other and further embodiments of the invention may be devised without departing from the basic scope. Various other configurations and arrangements of the disclosed embodiments will be apparent to those of ordinary skill in the art. Accordingly, the scope of the invention is determined by the claims that follow.

What is claimed is:

1. A lens system comprising:
   an objective lens unit configured to establish an aperture stop;
   a positive triplet configured to simultaneously image light at an aperture stop in a wavelength range from about 3 to about 5 micrometers and light in a wavelength range from about 8 to about 12 micrometers to a common focal plane, said positive triplet comprising a first

TABLE 1

| Surface | Radius (Inches) | Thickness (Inches) | Lens Material | K | A | B | C | D |
|---|---|---|---|---|---|---|---|---|
| 252 | 1.63416 | 0.25 | GASIR1 | 0 | −.00944601 | −.00872125 | .00399527 | −.0067282 |
| 254 | 3.3716 | 0.005 | | | | | | |
| 256 | 1.13328 | 0.257233 | Germanium | | | | | |
| 258 | 0.84009 | 0.166561 | | | | | | |
| 260 | 6.31789 | 0.1 | Zinc Sulfide | | | | | |
| 262 | 2.28327 | 0.504144 | | | | | | |
| 264 | 1.69138 | 0.562585 | GASIR1 | 0 | −.0555303 | −.0478887 | −0.221533 | 0.128622 |
| 266 | −2.70443 | 0.005 | | | | | | |
| 268 | −4.08629 | 0.980281 | Germanium | 0 | 0.101368 | −0.142656 | 0.275986 | −0.150388 |
| 270 | −6.78355 | 0.117148 | | 0 | .184561 | −1.65657 | .086152 | .00545905 |
| 272 | −2.41873 | 0.15 | Zinc Sulfide | | | | | |
| 274 | 26.51385 | 0.281927 | | 0 | −0.181055 | .0790944 | 1.36345 | −1.743600 |

There is thus provided, according to one aspect of the present invention, a lens system including a plurality of lens elements including at least one molded aspheric chalcogenide lens element having an associated Abbe number $V_{3-13}$ in the range from about 47.799 to 47.837. The lens elements may be configured to simultaneously image light in a wavelength range from about 3 to about 5 micrometers and light in a wavelength range from about 8 to about 12 micrometers at a common focal plane.

According to another aspect of the invention, there is provided a system including: a plurality of lens elements including at least one molded aspheric chalcogenide lens element having an associated Abbe number $V_{3-13}$ in the range from about 47.799 to 47.837, the plurality of lens molded aspheric chalcogenide lens element positioned to receive light directly from said aperture stop and having an associated Abbe number $V_{3-13}$ in the range from about 47.799 to 47.837 calculated as:

$$V_{3-13} = (N_{8-1})/(N_3 - N_{13})$$

where $N_8$ is the refractive index at a wavelength of 8 micrometers, $N_3$ is the refractive index at a wavelength of 3 micrometers and $N_{13}$ is the refractive index at a wavelength of 13 micrometers.

2. The lens system of claim 1, wherein said frist molded chalcogenide lens element has an index of refraction in the range from about 2.5009 to 2.5021 at 8 micrometers.

3. The lens system of claim 1, said objective lens unit comprising a second molded aspheric chalcogenide lens element.

4. The lens system of claim 3, wherein said objective lens unit further comprises a negative germanium lens element and a negative zinc sulfide lens element.

5. The lens system of claim 4 wherein said positive triplet further comprises a germanium lens element and a zinc sulfide lens element.

6. A system comprising:
   an objective lens unit configured to establish an aperture stop;
   a positive triplet configured to simultaneously image light at an aperture stop in a wavelength range from about 3 to about 5 micrometers and light in a wavelength range from about 8 to about 12 micrometers to a common focal plane, said positive triplet comprising a first molded aspheric chalcogenide lens element positioned to receive light directly from said aperture stop and having an associated Abbe number $V_{3\text{-}13}$ in the range from about 47.799 to 47.837 calculated as:

$$V_{3\text{-}13}=(N_{8-1})/(N_3\_N_{13})$$

where $N_8$ is the refractive index at a wavelength of 8 micrometers, $N_3$ is the refractive index at a wavelength of 3 micrometers and $N_{13}$ is the refractive index at a wavelength of 13 micrometers,
   a detector positioned at said common focal plane and configured to create electrical impulses in response to said light in said wavelength range from about 3 to about 5 micrometers and said light in said wavelength range from about 8 to about 12 micrometers; and
   a signal processing unit configured to process said electrical impulses for displaying an image.

7. The system of claim 6, wherein said first molded chalcogenide lens element has an index of refraction in the range from about 2.5009 to 2.5021 at 8 micrometers.

8. The system of claim 6, said objective lens unit comprising a second molded aspheric chalcogenide lens element.

9. The system of claim 8, wherein said objective lens unit further comprises a negative germanium lens element and a negative zinc sulfide lens element.

10. The system of claim 9, wherein said positive triplet further comprises a germanium lens element and a zinc sulfide lens element.

11. A method comprising:
    imaging light in a wavelength range from about 3 to about 5 micrometers and light in a wavelength range from about 8 to about 12 micrometers at an aperture stop established by an objective lens unit to a common focal plane using a positive triplet comprising a first molded aspheric chalcogenide lens element positioned to receive light directly from said aperture stop and having an associated Abbe number $V_{3\text{-}13}$ in the range from about 47.799 to 47.837 calculated as:

$$V_{3\text{-}13}=(N_{8-1})/(N_3\_N_{13})$$

where $N_8$ is the refractive index at a wavelength of 8 micrometers, $N_3$ is the refractive index at a wavelength of 3 micrometers and $N_{13}$ is the refractive index at a wavelength of 13 micrometers; and
    displaying an image in response to said light at said common focal plane.

12. The method of claim 11, said objective lens unit comprising a second molded aspheric chalcogenide lens element.

13. The method of claim 12, wherein said objective lens unit further comprises a negative germanium lens element and a negative zinc sulfide lens element.

14. The method of claim 13, wherein said positive triplet further comprises a germanium lens element and a zinc sulfide lens element.

* * * * *

UNITED STATES PATENT AND TRADEMARK OFFICE
CERTIFICATE OF CORRECTION

PATENT NO. : 7,369,303 B2　　　　　　　　　　　　　　　　　　　　Page 1 of 1
APPLICATION NO. : 11/346707
DATED : May 6, 2008
INVENTOR(S) : Tejada It is certified that error appears in the above-identified patent and that said Letters Patent is hereby corrected as shown below:

In column 4, line 59, in Claim 1, delete "$V_{3-13}=(N_{8-1})/(N_3\_N_{13})$" and insert -- $V_{3-13}=(N_8-1)/(N_3-N_{13})$ --, therefor.

In column 4, line 65, in Claim 2, delete "frist" and insert -- first --, therefor.

In column 5, line 10, in Claim 6, delete "compnsing:" and insert -- comprising: --, therefor.

In column 5, line 23, in Claim 6, delete "$V_{3-13}=(N_{8-1})/(N_3\_N_{13})$" and insert -- $V_{3-13}=(N_8-1)/(N_3-N_{13})$ --, therefor.

In column 6, line 20, in Claim 11, delete "$V_{3-13}=(N_{8-1})/(N_3\_N_{13})$" and insert -- $V_{3-13}=(N_8-1)/(N_3-N_{13})$ --, therefor.

Signed and Sealed this

Twelfth Day of August, 2008

JON W. DUDAS
*Director of the United States Patent and Trademark Office*